US010259579B2

(12) United States Patent
Goldstein

(10) Patent No.: US 10,259,579 B2
(45) Date of Patent: Apr. 16, 2019

(54) SELF-ENCLOSED AIR VEHICLE

(71) Applicant: GoPro, Inc., San Mateo, CA (US)

(72) Inventor: Ryan Michael Goldstein, Hidden Hills, CA (US)

(73) Assignee: GoPro, Inc., San Mateo, CA (US)

( * ) Notice: Subject to any disclaimer, the term of this patent is extended or adjusted under 35 U.S.C. 154(b) by 0 days.

(21) Appl. No.: 16/014,766

(22) Filed: Jun. 21, 2018

(65) Prior Publication Data

US 2018/0297704 A1    Oct. 18, 2018

Related U.S. Application Data

(63) Continuation of application No. 14/973,466, filed on Dec. 17, 2015, now Pat. No. 10,011,354.

(60) Provisional application No. 62/093,968, filed on Dec. 18, 2014.

(51) Int. Cl.
*B64C 39/02* (2006.01)

(52) U.S. Cl.
CPC ...... *B64C 39/024* (2013.01); *B64C 2201/027* (2013.01); *B64C 2201/108* (2013.01); *B64C 2201/20* (2013.01); *B64C 2201/203* (2013.01)

(58) Field of Classification Search
CPC .......... B64C 2201/20; B64C 2201/201; B64C 2201/203; B64C 39/024; B64C 2201/102; B64C 25/04
See application file for complete search history.

(56) References Cited

U.S. PATENT DOCUMENTS 8,453,962 B2 * 6/2013 Shaw ............... B64C 27/20
            244/12.4
8,827,200 B2 * 9/2014 Radu ............... B60F 5/02
            244/2
9,446,845 B2 * 9/2016 Mintchev ........... B64C 39/024
(Continued)

FOREIGN PATENT DOCUMENTS

KR          200405362      * 10/2005

OTHER PUBLICATIONS

Anura, the Drone That Fits in Youir Pocket, Launched Kickstarter Campaign Dated Oct. 21, 2014 https://dronelife.com/2014/10/21/anura-drone-fits-pocket-launches-kickstarter-campaign/ (Year: 2014).*
(Continued)

*Primary Examiner* — Justin M Benedik
(74) *Attorney, Agent, or Firm* — Young Basile Hanlon & MacFarlane, P.C.

(57) ABSTRACT

Vehicles such as unmanned air vehicles that are capable of movement from an open, flight configuration to an enclosed configuration in which all major flight components can be protected by an outer shell are disclosed. In the enclosed configuration, the vehicles can take on standard geometric shapes such as a rectangular prism, sphere, cylinder, or another shape, so as to not be recognizable as an unmanned air vehicle. Embodiments of vehicles can also include interchangeable and/or wireless motor arms, motor arms which are electrically connected to the remainder of the vehicle only when in an open configuration, remote controllers removably attached to the remainder of the vehicle, and clip or other attachment mechanisms for attachment to objects such as backpacks.

15 Claims, 10 Drawing Sheets

(56) References Cited

U.S. PATENT DOCUMENTS

| | | | |
|---|---|---|---|
| 2011/0019558 A1* | 1/2011 | Rowe | H04L 43/0858 |
| | | | 370/252 |
| 2015/0311941 A1* | 10/2015 | Sorrentino | H04M 1/185 |
| | | | 455/575.8 |
| 2015/0321755 A1* | 11/2015 | Martin | B64C 27/50 |
| | | | 244/17.23 |
| 2016/0114887 A1* | 4/2016 | Zhou | B60F 5/02 |
| | | | 348/148 |
| 2016/0179096 A1* | 6/2016 | Bradlow | B64C 19/00 |
| | | | 701/8 |

OTHER PUBLICATIONS

Backpack Folding Quadcopter by MaxPower dated Jan. 2, 2015 (31 pgs).
Foldable Quadrotor is Origamilicious by Elliot Williams dated May 26, 2015 (6 pgs).
Drone startups: Anura pocket drone by Dronologista dated Oct. 9, 2014 (13 pgs).
Here AirDog, Good Drone by Marshal Rosenthal dated Jun. 5, 2015 (4 pgs).
Sub-$500 Pocket Drone folds for transport and carries a GoPro by Ben Coxworth dated Jan. 15, 2014 (10 pgs).
"Weekly Innovation: This Drone Fits in Your Pocket" by Samantha Raphelson, Oct. 9, 2014, http://capeandislands.org/post/ weekly-innovation-drone-fits-your-pocket#stream/0 (accessed Nov. 11, 2017) (Year: 2014) (5 pages).

* cited by examiner

SELF-ENCLOSED AIR VEHICLE

CROSS REFERENCE TO RELATED APPLICATIONS

This application is a continuation of U.S. patent application Ser. No. 14/973,466, filed on Dec. 17, 2015, which claims priority to U.S. Provisional Pat. App. Ser. No. 62/093,968, filed on Dec. 18, 2014, the entire content of each of these applications being incorporated by reference herein.

BACKGROUND

1. Field of the Disclosure

The present disclosure relates generally to automated air vehicles, such as drones, and particularly to unmanned multirotor air vehicles capable of automated and/or manual enclosure in order to protect vital components.

2. Description of the Related Art

Unmanned air vehicles, often referred to as drones, have become more and more common in recent years. However, these drones can be unsightly and unwieldy, with many protrusions for, for example, holding propellers. Such designs can be difficult to manually transport, and/or can leave vital components exposed to the elements and thus the possibility of damage.

SUMMARY

The present disclosure provides vehicles capable of automated and/or manual articulated movement between an enclosed configuration and an open, or flight, configuration.

One embodiment of a vehicle according to the present disclosure can include a body with an outer shell and a motor arm cavity, and a motor arm movably attached to the body. The motor arm can include a motor and an outer surface, and can be moved such that when said unmanned air vehicle is in an enclosed position, the motor is within the cavity.

One embodiment of a drone according to the present disclosure can include a main body with an outer shell and one or more pin receptacles, and a foldable motor arm including one or more contact pins. When the motor arm is in an open position, the contact pins can electrically connect to the pin receptacles.

One embodiment of an unmanned air vehicle according to the present disclosure can be configured for articulated movement between an open flight configuration, and an enclosed configuration wherein one or more motor arms, propellers, and landing gear are enclosed within an outer shell.

These and other further features and advantages of the disclosure would be apparent to those skilled in the art from the following detailed description, taken together with the accompanying drawings, in which:

DETAILED DESCRIPTION

Figure 1:
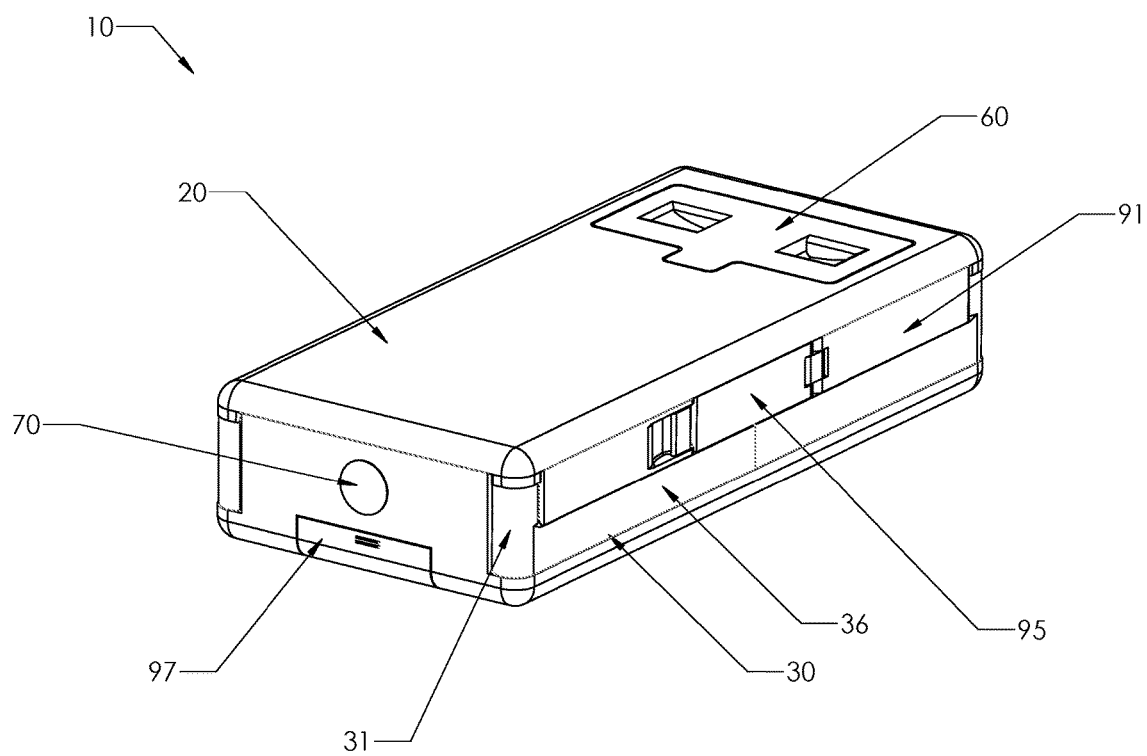
FIG. 1 is a perspective view of a vehicle in an enclosed configuration according to one embodiment of the present disclosure.

The present disclosure is directed toward unmanned vehicles, such as unmanned flying vehicles such as drones, which are movable in an articulated manner between an enclosed position and an open position. In the enclosed configuration, the major flight components of the vehicle can be protected by an outer shell, and/or all protrusions of the vehicle can be withdrawn such that the vehicle takes on a compact geometric shape such as a rectangular prism, cube, sphere, cylinder, and other shapes known in the art. In the open configuration, vehicles according to the present disclosure can operate like other similar unmanned vehicles and drones which do not have enclosed and open configurations.

Some embodiments of the present disclosure can include clips or other mechanisms for attachment to other devices, such as a backpack. Embodiments of the present disclosure can also include a remote controller removably attached to the vehicle, such as a remote controller only removable when the vehicle is in an open or flight configuration. Some other embodiments of vehicles according to the present disclosure can include motor arms which become electrically connected to the remainder of the vehicle when the vehicle is in the open or flight configuration, and/or motor arms which are interchangeable. Many different embodiments are possible.

It is understood that when an element is referred to as being "on" another element, it can be directly on the other element or intervening elements may also be present. Furthermore, relative terms such as "inner", "outer", "upper", "top", "above", "lower", "bottom", "beneath", "below", and similar terms, may be used herein to describe a relationship of one element to another. Terms such as "higher", "lower", "wider", "narrower", "raise", "lower", and similar terms, may be used herein to describe relative relationships. It is understood that these terms are intended to encompass all relationships which could be reasonably conveyed by their use.

Although the terms first, second, etc., may be used herein to describe various steps, elements, components, regions and/or sections, these steps, elements, components, regions, and/or sections should not be limited by these terms. These terms are only used to distinguish one step, element, component, region, or section from another. Thus, unless expressly stated otherwise, a first step, element, component, region, or section discussed below could be termed a second step, element, component, region, or section without departing from the teachings of the present disclosure.

Some embodiments of a vehicle according to the present disclosure are shown in FIGS. 1-10B. Different embodiments of such vehicles can comprise any combination of: (a) an unmanned air vehicle with two configurations, being open (or flight) and enclosed, (b) an articulating movement, (c) a protective and compact self-storage method, (d) a concealed design, (e) an integrated clip or clip attachment point, (f) a wire-less and/or interchangeable articulating motor arm 30, and (g) a removable and/or snap-in controller 80. Although the present disclosure will be described in detail with reference to certain preferred configurations thereof, other versions are possible. Therefore, the spirit and scope of the disclosure should not be limited to the versions described herein.

In the particular embodiments shown in FIGS. 1-5, the vehicle 10 comprises a main body 20, one or more motor arms 30, one or more propellers 39, landing gear 50, battery 60, sensors, electronics, payload 70, and/or any other variations of these components known in the art. The vehicle 10 can be movable in an articulated manner, which can allow the vehicle 10 to transition from a compact, enclosed configuration for, e.g., protection and/or transport by a person or other mechanism, to an open configuration for, e.g., flight. This movement can be automated and/or manual. In one embodiment, once in the closed position the components capable of articulated movement become locked in position so as to prevent unintended manual movement.

Figure 2:
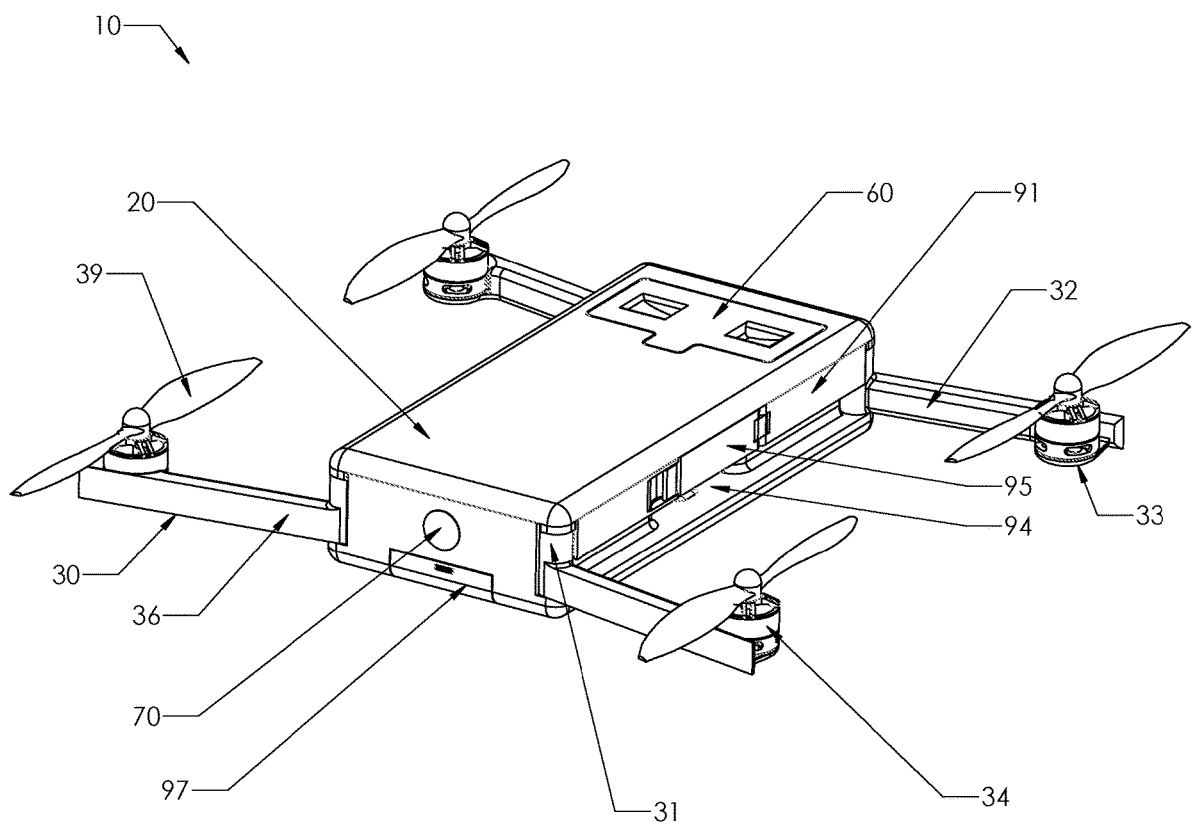
FIG. 2 is a perspective view of a vehicle in an open configuration according to one embodiment of the present disclosure.
Figure 3A:
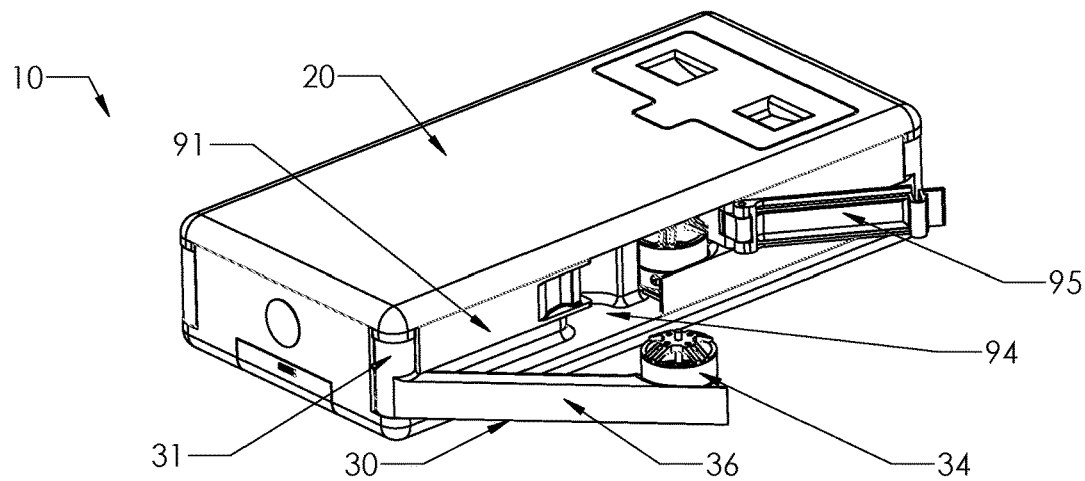
FIG. 3A is a perspective view of a vehicle with a motor arm partially open according to one embodiment of the present disclosure.
Figure 3B:
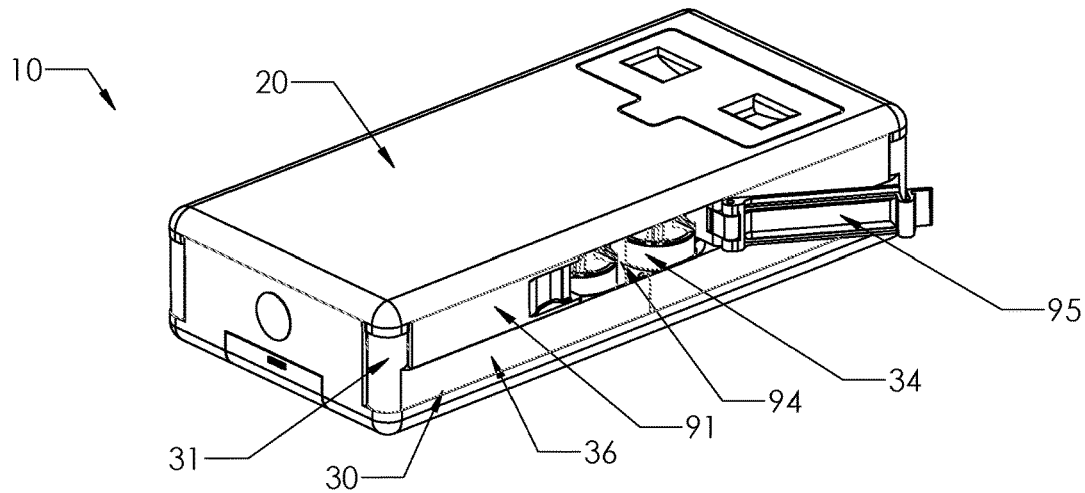
FIG. 3B is a perspective view of a vehicle with motor arms closed and a motor access panel open according to one embodiment of the present disclosure.
Figure 3C:
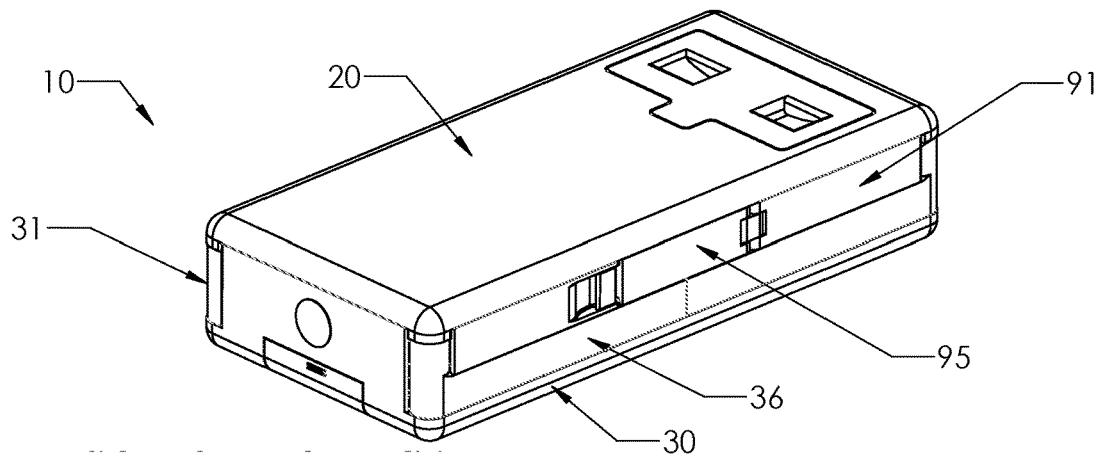
FIG. 3C is a perspective view of a vehicle with the motor arm access panel closed according to one embodiment of the present disclosure.
Figure 4:
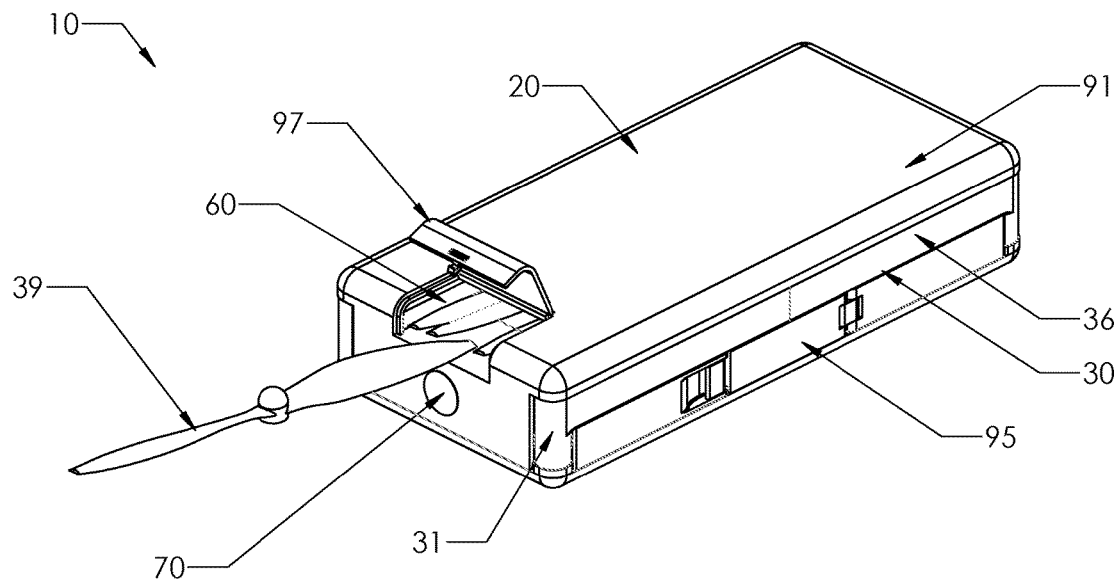
FIG. 4 is a bottom perspective view of a vehicle with propellers stored in a propeller cavity according to one embodiment of the present disclosure.
Figure 5:
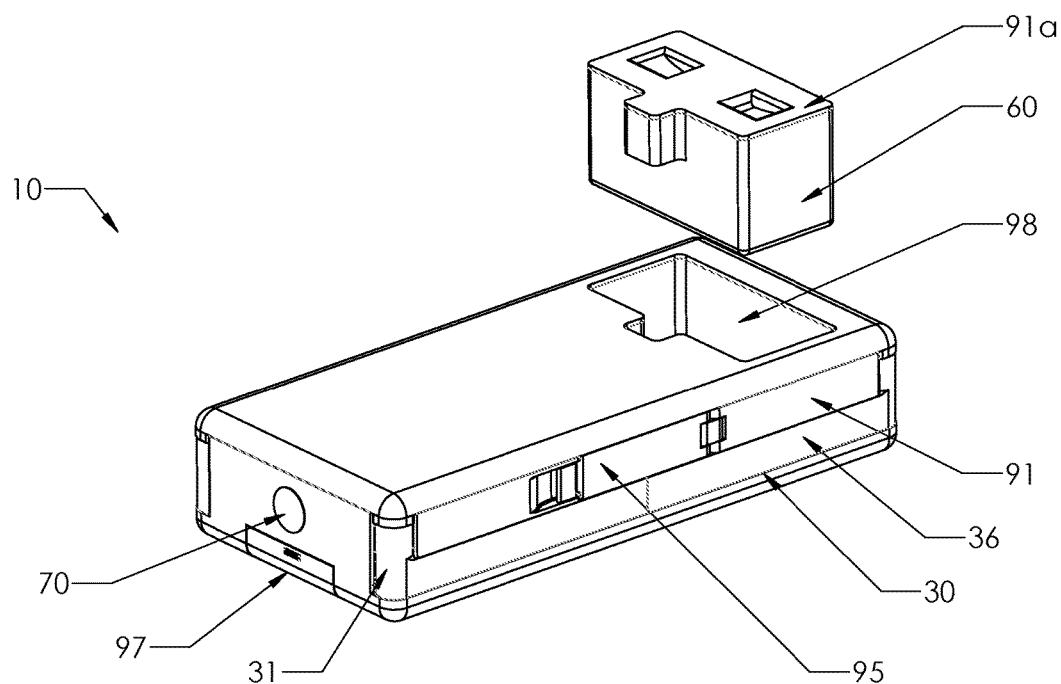
FIG. 5 is a partially exploded perspective view of a vehicle with the battery removed according to one embodiment of the present disclosure.

In one embodiment, while in an open or flight configuration as shown in FIG. 2, a number of motor arms 30 can be extended outward from the main body 20. The vehicle 10 can then take off, such as taking off vertically; hovering; and/or flying in any direction via user control, autonomously, or by other means known in the art. When in an open configuration, the motor arms 30 and/or other moveable components of the vehicle 10 can be locked in place, such as with a locking mechanism 35. Different embodiments of the vehicle 10 may include a payload 70, such as a camera that can be used for aerial image capture.

In one embodiment, while in the enclosed configuration, flight components and features such as motors 34, propellers 39, electronics, landing gear 50, and payload 70 are fully enclosed within the main body 20 of the vehicle 10, and thus protected from external objects that can cause damage. This protection can be provided by an integrated and continuous or near-continuous outer shell 91. In one embodiment of such a configuration, no flight components or features protrude from the continuous outer shell 91 and these components/features are therefore protected from external damage. While in this enclosed configuration, the vehicle 10 is capable of storing all needed components for flight within the vehicle 10 dimensions itself, unlike prior art devices which require a carrying case to externally store these items for protection and portability.

In one embodiment, the vehicle 10 can transition from an open configuration (e.g., flight configuration) to the enclosed configuration, or from an enclosed configuration to an open configuration, through the use of an articulating movement or other type of movement which can allow protruding flight components such as motor arms 30, propellers 39, landing gear 50, and/or payload 70 to fold or otherwise move into the main body 20. This folding or other style of movement can be accomplished without the use of tools, allowing for a quick and easy transition from the open configuration to the enclosed configuration and vice versa. This transition may be accomplished manually by the user and/or automatically using actuators, and can lock and/or secure components in place using one or more locking mechanisms such as the locking mechanisms 35 seen in FIG. 9A.

Embodiments of the present invention provide for a compact design definition that enables effective protection and storage of the flight components and features from foreign objects, such as debris or water. This can be achieved through the use of a continuous, near-continuous, and/or protective outer shell 91 which is partially or entirely part of the vehicle 10 itself.

The outer shell 91 may be a plastic, metal, composite, other material known in the art, and/or any combination thereof. The outer shell 91 can serve as a layer between foreign objects and flight components and features. This outer shell 91 may be part of the vehicle 10 itself or a separate, removable cap 92, which can contour to the outer shell 91 of the vehicle 10 when attached. Contouring to the outer shell 91 of the vehicle may mean that the outer surfaces of the joining pieces are substantially continuous and/or flush at any seam lines such as the seam line 93, covering any substantial gaps or protrusions. In one embodiment, the removable cap 92 may be used to protect the payload 70 and/or other components during storage, but removed for flight. This method differs from prior art devices, which require a separate protective carrying case where the inner surfaces of the carrying case contour to the outer surfaces on the vehicle 10.

In one embodiment, the main body 20 can contain cavities, and flight components and/or features can be stored partially or entirely within these cavities. When in the enclosed configuration, the flight components or features may be protected by access panels or by features or surfaces on the moveable flight components that contour to the shape of the main body, providing for a continuous outer shell 91. For example, as shown in FIGS. 1 and 2, motors 34 (shown in FIG. 2) can be stored in motor arm cavities 94 (shown in FIG. 2) such that the outer surface over the motor arm cavities 94 is relatively flush and/or continuous with the remainder of the shell 91 (as shown in FIG. 1).

In one embodiment, the moveable components of the vehicle include motor arms 30, propellers 39, and battery 60, with an integrated camera as the payload 70. It is understood that different embodiments can include any combination of these and/or additional features, such as landing gear. In the specific configuration shown in FIGS. 1-5, cavities exist in the main body 20 for storage and protection of the motor arms 30, propellers 39, and battery 60.

The motor arm 30 may consist of a rotation joint 31, support arm 32, motor mount 33, and/or motor 34. The motor arm 30 and motor 34 may be folded into the motor arm cavity 94 in the main body 20 when the vehicle 10 is in an enclosed configuration, and the outer facing surfaces 36 of the motor arms 30 can contour to the shape of the main body 20 providing for a continuous outer shell 91 to be formed. Thus, the motor arm 30 can be substantially flush with the main body 20, reducing or eliminating irregular or sharp protrusions that can easily become broken or damaged during actions such as transportation or storage of the vehicle 10. The motor arm cavity 94 may also contain a motor access panel 95 which can allow for any exposed part of the motor arm 30, motor 34, or motor arm cavity 94 to be further covered; therefore, protection from foreign objects, debris, or water and a continuous outer shell 91 can be achieved.

The propellers 39 may be removed from the motors 34 using a quick-adapting method such as threading, snapping, or latching, and stored within a propeller cavity 96 in the main body 20. The propeller cavity 96 allows for all propellers 39 used for flight to be stored within the main body 20 and covered, such as by a propeller access panel 97. This propeller access panel 97 can contour to the main body 20 as described above with other elements. In other embodiments, the propeller 39 can remain attached to the motor 34 when the vehicle 10 is in enclosure mode, such as by folding so as to fit within a motor arm cavity such as the motor arm cavities 94.

The battery 60 may be interchangeable such that when removed, there exists a battery cavity 98. The battery 60 itself may be protected with its own outer wall 91a, and when inserted into the battery cavity 98, the outer wall 91a can contour to the outer shell 91 of the vehicle 10, allowing for a continuous outer shell to be achieved. The battery cavity 98 may also contain an access panel that closes over the battery 60, protecting the battery cavity 98 and/or battery 60 from foreign objects and debris.

The electronics may be enclosed within the vehicle 10, which can provide for protection from foreign objects, debris, water, etc.

Vehicle cavities in general, and with regard to the embodiment shown the motor arm cavity 94, propeller cavity 96, and battery cavity 98, may also be used as a method of floatation for the vehicle 10 as a whole. By preventing water from entering the cavities, the air within the cavities creates a positive buoyancy for the vehicle 10, which can allow the vehicle 10 to float.

Figure 10A:
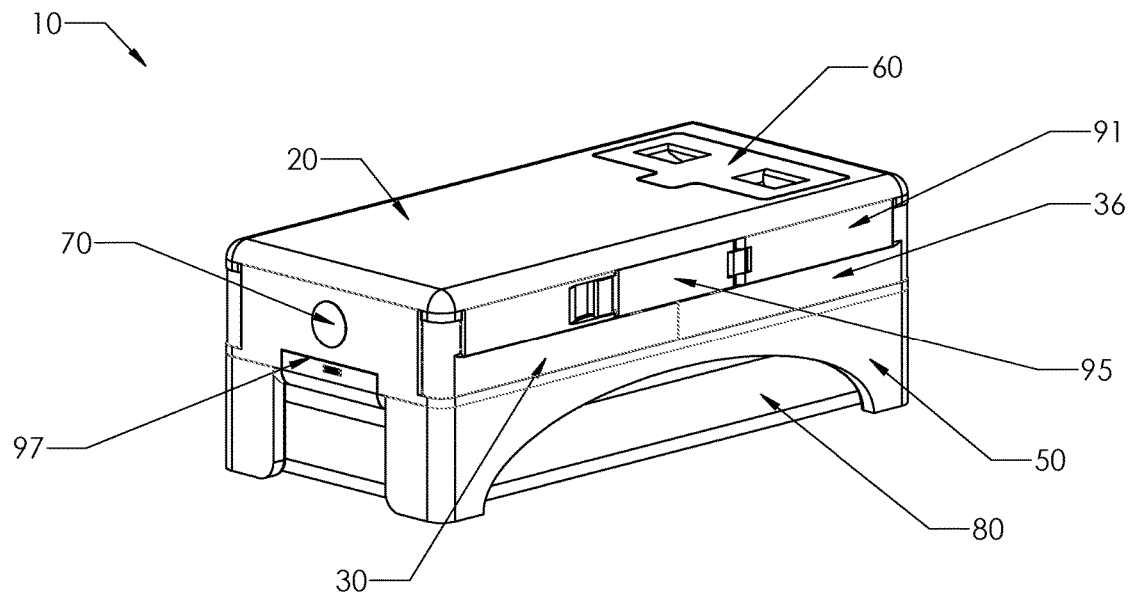
FIG. 10A is a perspective view of a vehicle with a removable controller according to one embodiment of the present disclosure.
Figure 10B:
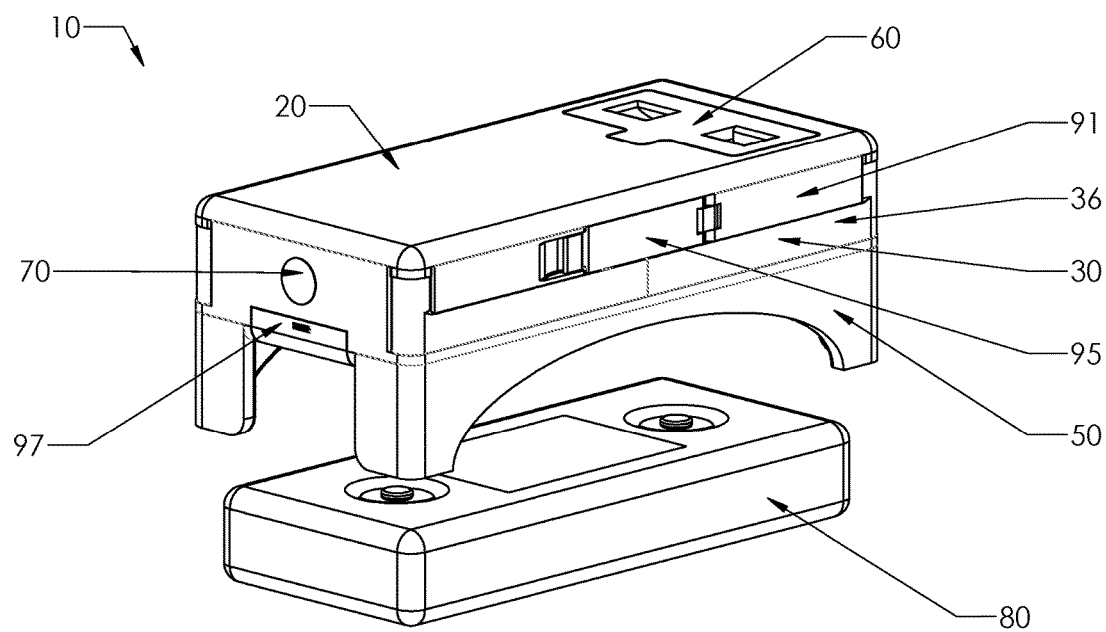
FIG. 10B is a perspective view of a vehicle with a removable controller detached according to one embodiment of the present disclosure.

In some embodiments where a landing gear 50 exists, such as that shown in FIGS. 10A and 10B, the landing gear 50 may be folded up and into, or otherwise moved into, a landing gear cavity in the main body 20 in a similar fashion as the motor arms 30. The landing gear 50 may also be integrated into the motor arm 30 and articulate as one and store in a combination motor arm and landing gear cavity.

Figure 6A:
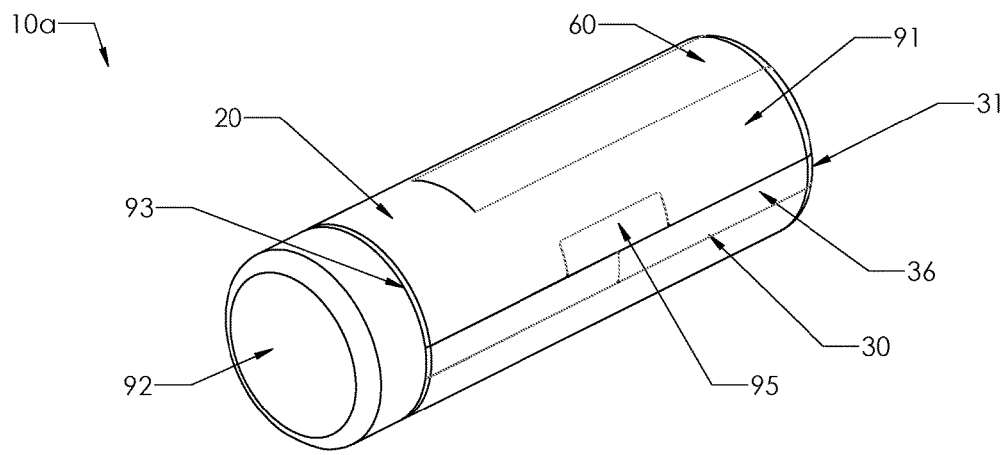
FIG. 6A is a perspective view of a cylindrical vehicle in an enclosed configuration according to one embodiment of the present disclosure.
Figure 6B:
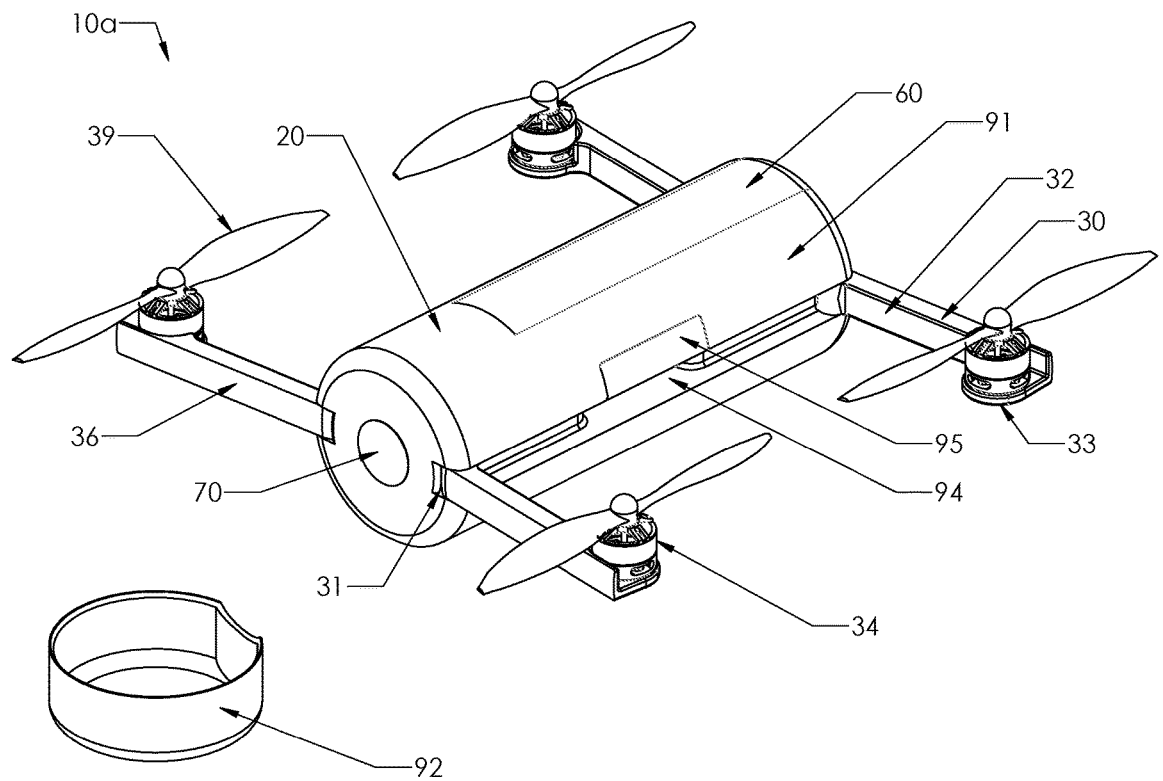
FIG. 6B is a perspective view of a cylindrical vehicle in an open configuration according to one embodiment of the present disclosure.
Figure 6C:
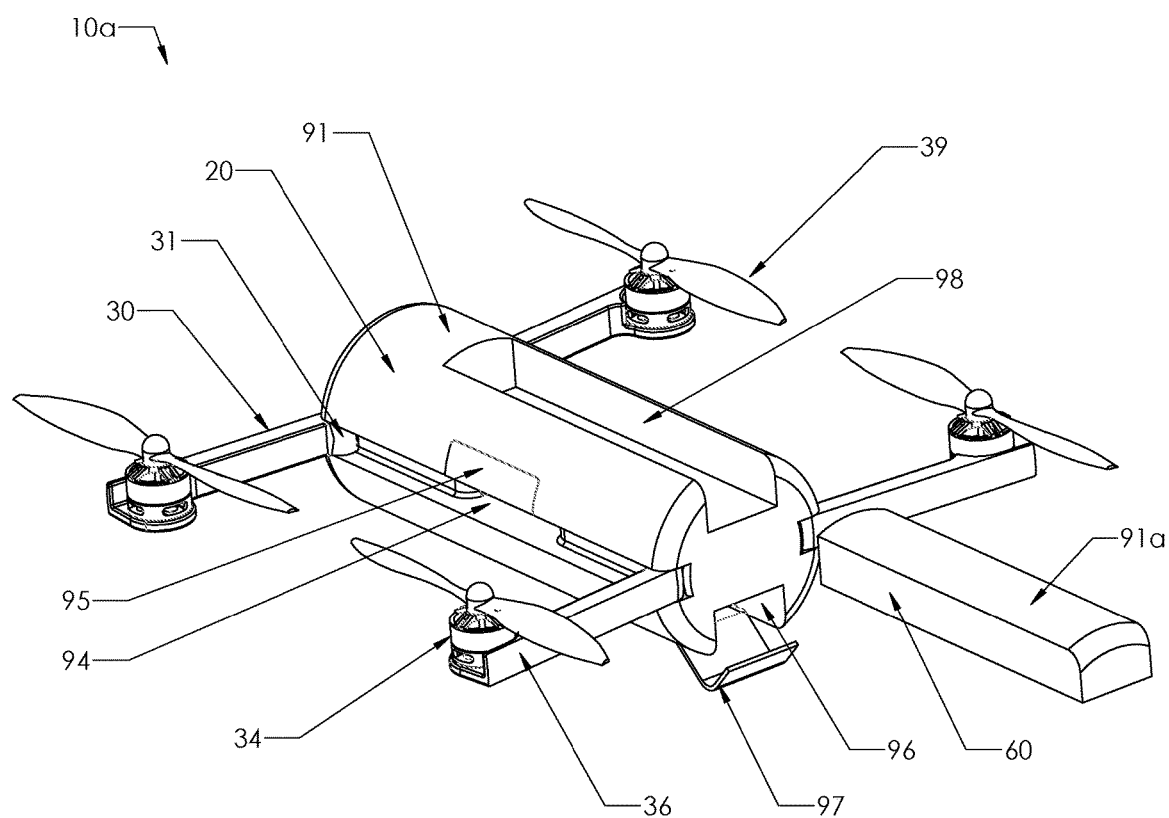
FIG. 6C is a partially exploded perspective view of a cylindrical vehicle with cavities exposed according to one embodiment of the present disclosure.
Figure 7A:
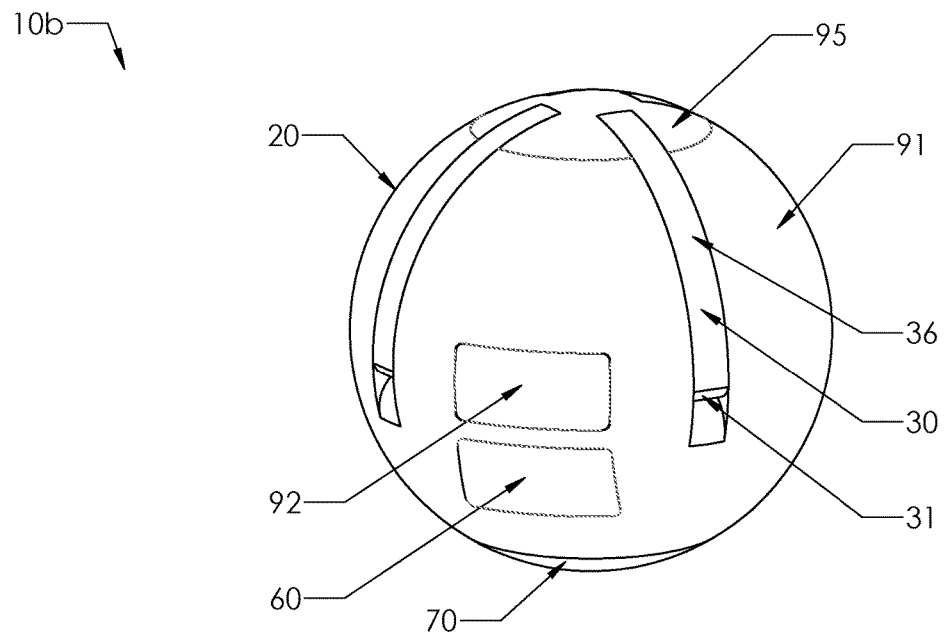
FIG. 7A is a perspective view of a spherical embodiment of a vehicle in an enclosed configuration according to one embodiment of the present disclosure.
Figure 7B:
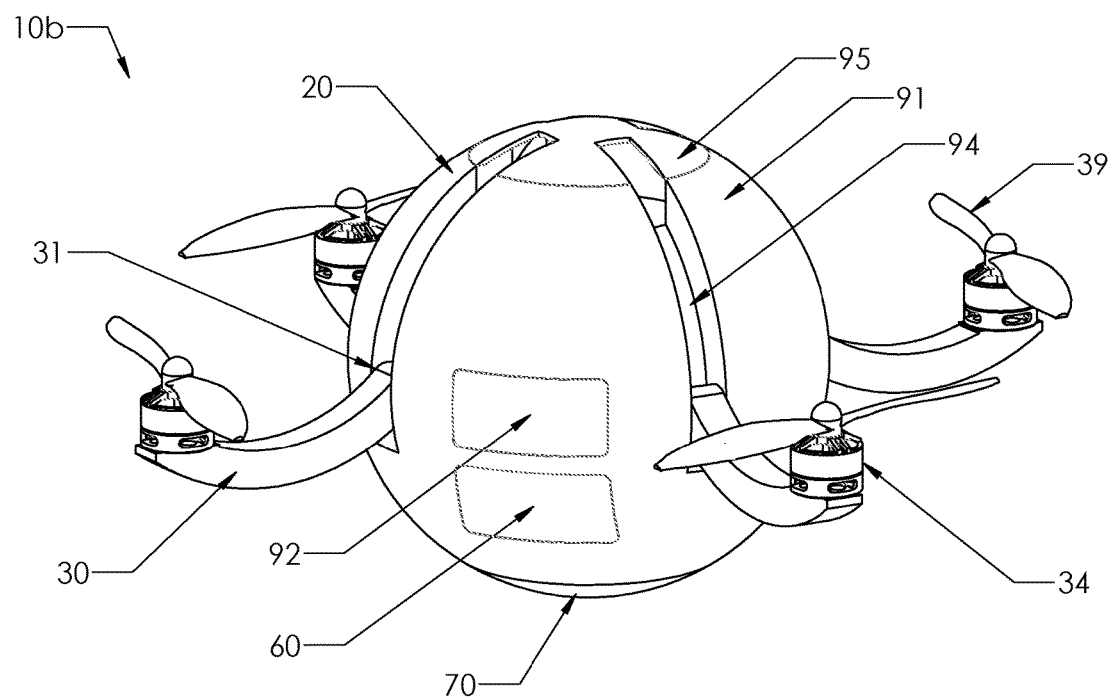
FIG. 7B is a perspective view of a spherical embodiment of a vehicle in an open configuration according to one embodiment of the present disclosure.

Due to the method of articulation and the protective and continuous outer shell 91, the vehicle 10 may be indistinguishable as a multirotor drone, thus having a concealed design. When in the enclosed configuration, the vehicle 10 may resemble a box, cylinder, disk, sphere, triangle, or other shape and have no identifiable protrusions of the flight components or features, such as motors 34 and propellers 39, as seen with multirotors and drones currently known in the art. For example, FIGS. 6A-6C show one embodiment of a substantially cylindrical vehicle 10a with many components similar to or the same as those shown in the embodiment of FIGS. 1-5. FIGS. 7A and 7B show one embodiment of a substantially spherical vehicle 10b with many components similar to or the same as those shown in the embodiment of FIGS. 1-5.

Figure 8A:
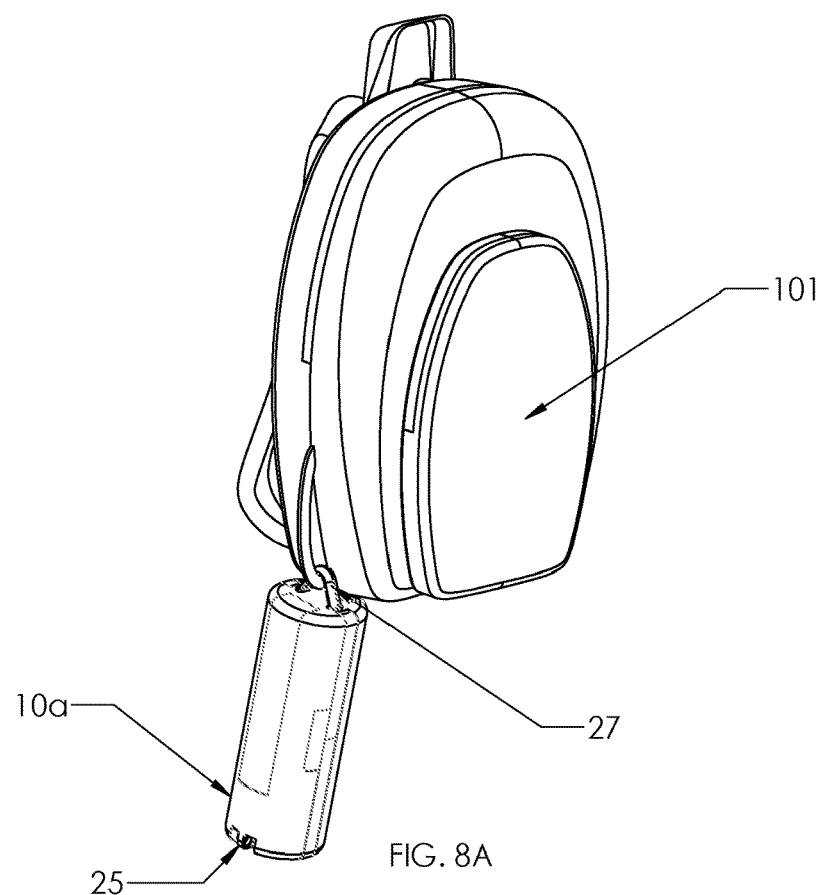
FIG. 8A is a perspective view of a cylindrical embodiment of a vehicle according to one embodiment of the present disclosure attached to a backpack.
Figure 8B:
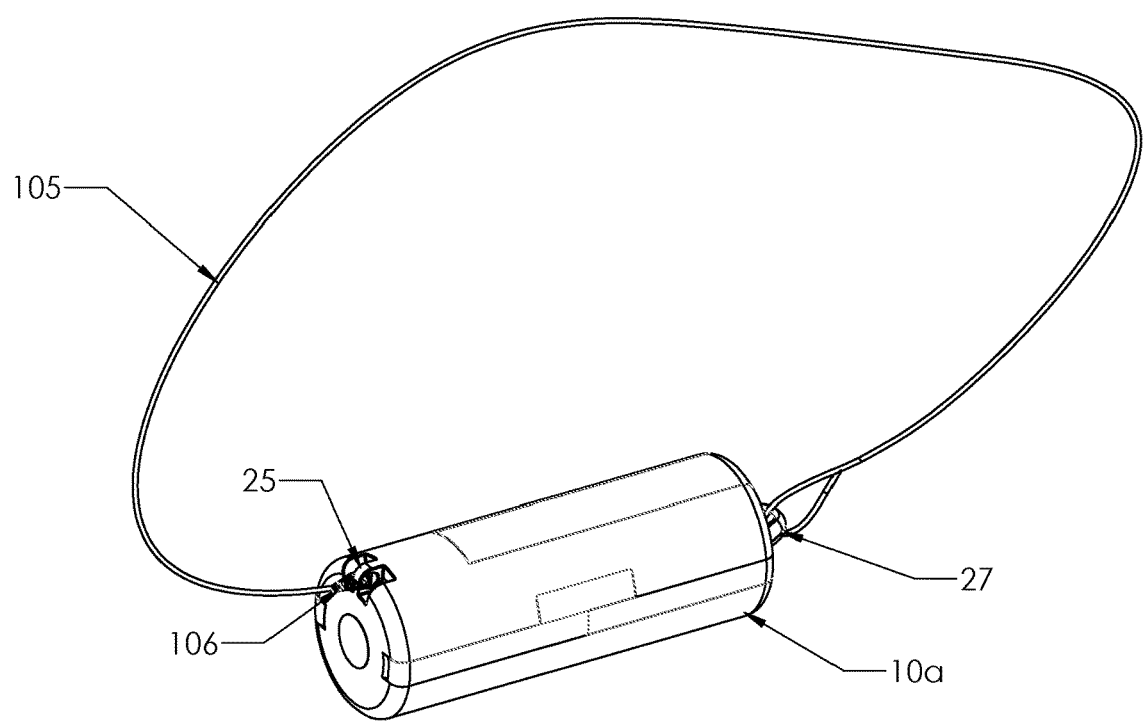
FIG. 8B is a perspective view of a cylindrical embodiment of a vehicle according to one embodiment of the present disclosure.
Figure 9A:
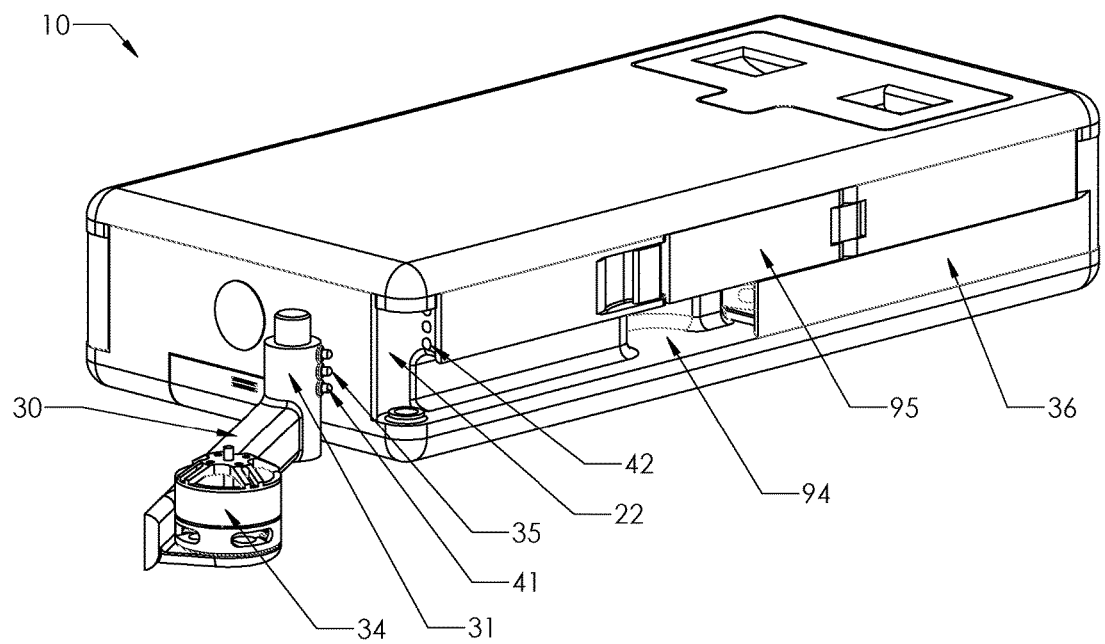
FIG. 9A is a perspective view of a vehicle with a motor arm removed according to one embodiment of the present disclosure.
Figure 9B:
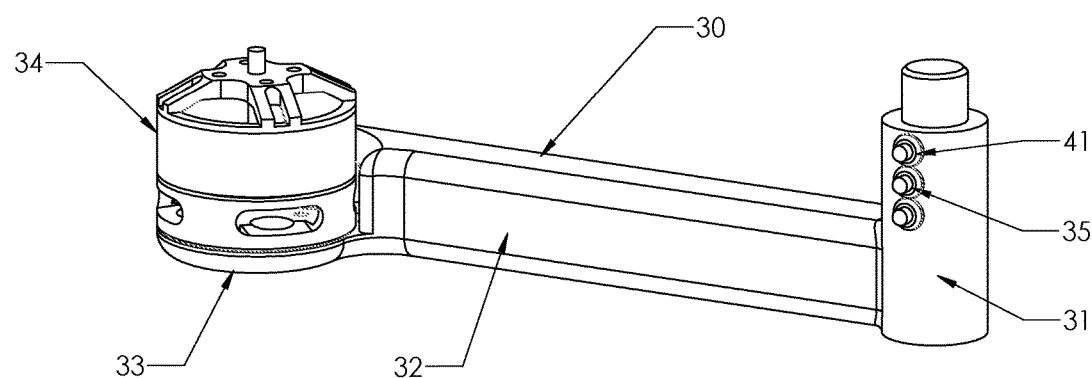
FIG. 9B is a perspective view of a motor arm according to one embodiment of the present disclosure.

In one embodiment of the present invention shown in FIGS. 8A and 8B, the vehicle 10 contains a number of integrated clips 27 or clip attachment points 25, which allow the vehicle 10 to attach onto objects for quick and convenient transportation or storage. When an integrated clip 27 exists, it may be located on the main body 20 of the vehicle 10 and allow the vehicle 10 to be easily attached to another object such as the backpack 101 shown in FIG. 8A, a belt, a bracelet, a keychain, or any other object capable of clip-style attachment.

The integrated clips 27 and clip attachment points 25 may also be used to attach a strap 105 or rope so the vehicle 10 itself can be carried like a backpack 101 or satchel, with one such embodiment shown in FIG. 8B. In one embodiment, the vehicle 10 includes one integrated clip 27 and one clip attachment point 25, although other embodiments can have more than one clip and/or clip attachment point. The integrated clip 27 can attach onto a loop in the strap 105, while the clip attachment point 25 can use a separate, external clip 106 to attach the strap 105 to the vehicle 10. This describes one embodiment, however other embodiments exist where objects are attached to the vehicle 10 using similar methods known in the art.

In one embodiment, the vehicle 10 contains a wire-less and/or interchangeable motor arm design. In embodiments with interchangeable motor arms such as that shown in FIGS. 9A and 9B, any of the motor arms 30 may be easily replaced in the event that it becomes damaged. Easy replacement can be facilitated by an electrical connection from the main body 20 to the motor 34 and motor arm 30 which does not include wires, but still allows for full articulation of the motor arm 30.

Conductive contact pins 41 may be disposed on the motor arm 30. In one embodiment, the pins can make contact with conductive receptacles 42 on the main body 20. When the motor arm 30 is rotated out of the flight position, the connection can be interrupted such that no power runs to the motor arm 30. This connection may provide electrical power to the motor 34 and any other electrical components on the motor arm 30, such as light emitting diodes or sensors. Since the electrical connection can be interrupted when in the enclosed configuration and completed while in the flight configuration, these contact pins 41 may also be used as a switch to enable and disable power from reaching the motor arm 30. In other embodiments, electrical contact between the main body and motor arm is not interrupted based on vehicle configuration.

In some embodiments where spring loaded conductive contact pins 41 are used, the electrical connection is used as both an electrical connection and a locking mechanism 35 for the arm by using conductive detent receptacles 42 that can catch the pin ends. This describes one embodiment, however, other embodiments exist where other electrical connection methods known in the art are used.

The contact pins 41 can include locking mechanisms 35, such as on their ends. Locking mechanisms 35 can lock the contact pins 41 into the conductive receptacles 42 of the main body 20, or otherwise lock the contact pins 41 to the main body 20. Other locking mechanisms, including locking mechanisms attached to, part of, or separate from the contact pins 41, are possible.

The described method allows for a motor arm 30 to be inserted into a motor arm socket 22 without having to plug in a connector using a device such as a wire harness. This describes one embodiment, however, other embodiments exist where the motor arm 30 slides outward or otherwise opens, rather than rotating from the main body 20, to make an electrical contact.

The described method of electrical connection using conductive contact pins 41 and detent receptacles 42 may also be used on other movable components that may require electrical power. In one embodiment, the landing gear 50 contains sensors which receive power through contact pins and/or detent receptacles while in the flight position, and disconnect when in the enclosed position. Other embodiments with a constant electrical connection are possible.

In one embodiment, the vehicle 10 can be controlled using a remote controller 80. In some such embodiments the controller 80 attaches to the vehicle 10 when in the enclosed configuration and detaches for use when the vehicle 10 is in the flight configuration. Thus, the vehicle 10, and its accessories, can remain as compact as possible while in the enclosed configuration. The remote controller 80 may contour to the shape of the vehicle 10, aligning to the main body 20 and/or outer shell 91 as previously described.

In one embodiment the controller 80 can be attached to the bottom of the vehicle 10, such as in-between the landing gear 50. The controller 80 can conform to the shape of the main body 20 and landing gear 50, such that both the landing gear 50 and the controller 80 nest together such that when the vehicle 10 and controller 80 are attached together, there are no sharp or discontinuous protrusions from the vehicle 10. This describes one embodiment, however, other embodiments exist where the controller 80 attaches in other manners.

As would be understood by one of skill in the art, the devices described above can include many different materials, including but not limited to semi-rigid and/or rigid polymers and/or metals or similar materials.

Although the present disclosure has been described in detail with reference to certain preferred configurations thereof, other versions are possible. Therefore, the spirit and scope of the disclosure should not be limited to the versions described above.

What is claimed is:

1. An unmanned air vehicle repositionable between a transport configuration and a flight configuration, the unmanned air vehicle comprising:
    a body supporting a camera;
    a cap configured to protect the camera, the cap being configured for releasable connection to the body such that the cap can be removed from the body before flight of the unmanned air vehicle;
    at least one arm attached to the body and supporting a propeller, the at least one arm being movable between a first position, in which the unmanned air vehicle is in the transport configuration and an outer surface of the at least one arm is substantially flush with an outer surface of the body, and a second position, in which the unmanned air vehicle is in the flight configuration and the at least one arm extends outwardly from the body; and
    landing gear movable between an undeployed configuration, wherein the landing gear is in a first position, and a deployed configuration, wherein the landing gear is in a second position to support the unmanned air vehicle during landing, wherein the landing gear is included on the at least one arm.

2. The unmanned air vehicle of claim 1, wherein the cap includes a contour corresponding to a contour defined by the body.

3. The unmanned air vehicle of claim 1, wherein the cap and the body include corresponding contact surfaces such that the cap can be flush-mounted to the body.

4. The unmanned air vehicle of claim 1, wherein the camera protrudes from the body.

5. The unmanned air vehicle of claim 1, wherein the camera is movably connected to the body.

6. The unmanned air vehicle of claim 1, wherein the propeller is movable between inactive and active positions, the propeller being configured for flight in the active position.

7. An unmanned air vehicle repositionable between a transport configuration and a flight configuration, the unmanned air vehicle comprising:
    a body supporting a camera;
    at least one arm attached to the body configured and dimensioned to support a propeller, the at least one arm being reconfigurable between a first configuration, wherein an outer surface of the at least one arm is substantially flush with an outer surface of the body, and a second configuration, wherein the at least one arm extends outwardly from the body; and
    landing gear transitional between an inactive configuration when the unmanned air vehicle is in the transport configuration and an active configuration when the unmanned air vehicle is in the flight configuration, wherein the landing gear is included on the at least one arm.

8. The unmanned air vehicle of claim 7, wherein the at least one arm includes a first arm and a second arm, the first arm being movable towards the body in a first direction during movement from the second configuration to the first configuration, and the second arm being movable towards the body in a second direction opposite the first direction during movement from the second configuration to the first configuration.

9. The unmanned air vehicle of claim 7 further including a cap configured to protect the camera.

10. The unmanned air vehicle of claim 9, wherein the cap includes a contour corresponding to a contour defined by the body.

11. The unmanned air vehicle of claim 9, wherein the cap is configured for releasable connection to the body such that the cap can be removed from the body before flight of the unmanned air vehicle.

12. The unmanned air vehicle of claim 11, wherein the cap and the body include corresponding contact surfaces such that the cap can be flush-mounted to the body.

13. The unmanned air vehicle of claim 7, wherein the camera protrudes from the body.

14. The unmanned air vehicle of claim 7, wherein the camera is movably connected to the body.

15. The unmanned air vehicle of claim 7, wherein the propeller is movable between inactive and active positions, the propeller being configured to facilitate flight of the unmanned air vehicle in the active position.

\* \* \* \* \*